United States Patent [19]

Miyawaki et al.

[11] Patent Number: 5,502,540
[45] Date of Patent: Mar. 26, 1996

[54] PRINTING/DEVELOPING APPARATUS

[75] Inventors: Hiroshi Miyawaki; Takayuki Oka, both of Wakayama; Masaaki Tsuji, Hannan, all of Japan

[73] Assignee: Noritsu Koki Co., Ltd., Wakayama, Japan

[21] Appl. No.: 240,659

[22] PCT Filed: Sep. 16, 1993

[86] PCT No.: PCT/JP93/01319

§ 371 Date: May 17, 1994

§ 102(e) Date: May 17, 1994

[87] PCT Pub. No.: WO94/07182

PCT Pub. Date: Mar. 31, 1994

[30] Foreign Application Priority Data

Sep. 17, 1992 [JP] Japan ................................. 4-273789

[51] Int. Cl.⁶ ........................... G03B 27/32; G03B 35/14; G03B 35/24
[52] U.S. Cl. .............................. 355/22; 355/50
[58] Field of Search ...................... 355/27, 28, 50, 355/75, 54, 22

[56] References Cited

U.S. PATENT DOCUMENTS

| | | | |
|---|---|---|---|
| 3,689,149 | 9/1972 | Livingood | 355/54 X |
| 4,837,601 | 6/1989 | Nakane et al. | 355/28 |
| 4,918,483 | 4/1990 | Otake | 355/54 X |
| 4,963,919 | 10/1990 | Matsumoto et al. | 355/54 X |

FOREIGN PATENT DOCUMENTS

| | | |
|---|---|---|
| 57-60324 | 4/1982 | Japan . |
| 58-7981 | 2/1983 | Japan . |
| 59-100427 | 6/1984 | Japan . |

*Primary Examiner*—Fred L. Braun
*Attorney, Agent, or Firm*—Oblon, Spivak, McClelland, Maier & Neustadt

[57] ABSTRACT

In front of an exposure stage and behind the exposure stage, loop spaces are provided on the roll paper transporting path of a printing/developing apparatus. The movement of the exposure stage is ensured by the loop. When the roll paper is fixed, one loop space is provided in front of the exposure stage, and one loop space behind the stage, thus allowing the exposure stage to move. Alternatively, the negative mask unit and lens unit of the apparatus are movable, so that roll paper is usable when the exposure stage is fixed.

1 Claim, 5 Drawing Sheets

F I G. 5
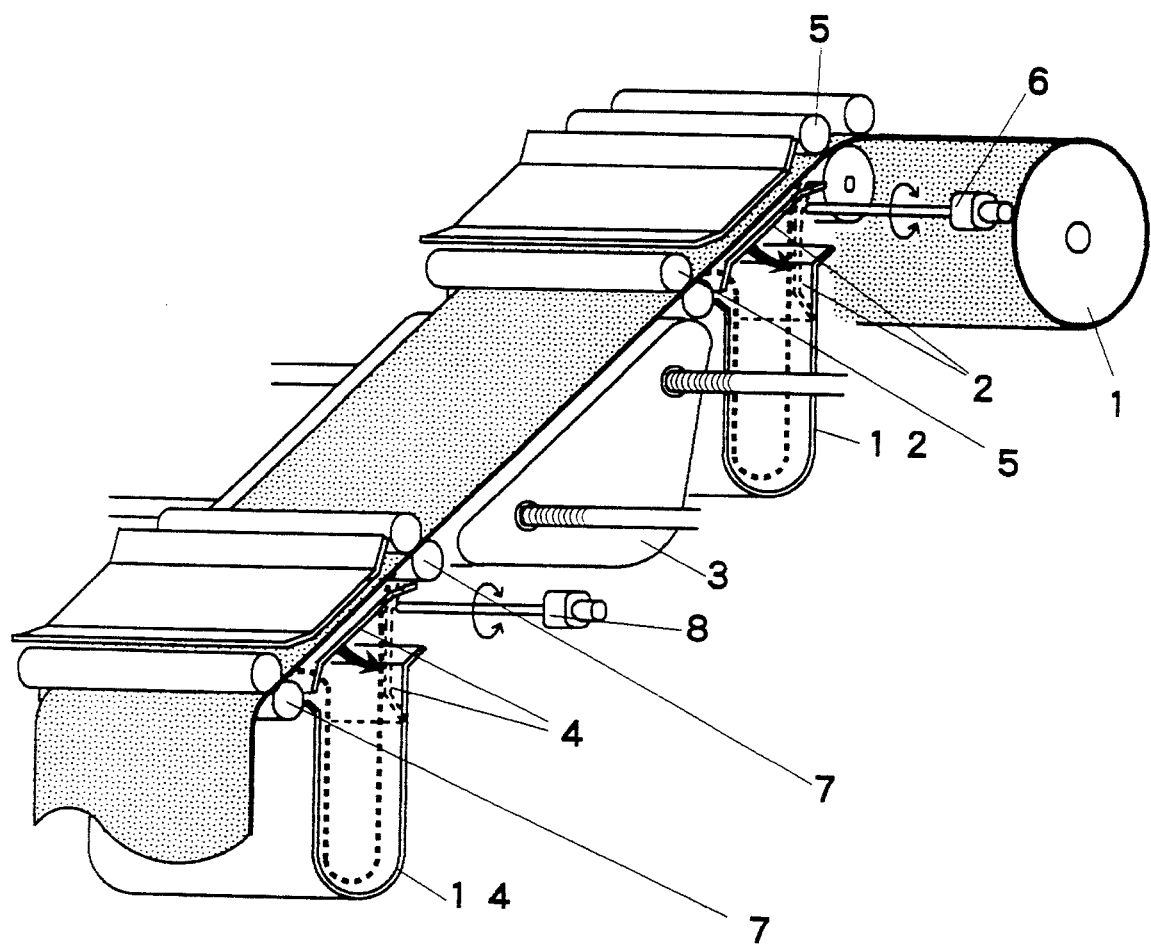

F I G. 6
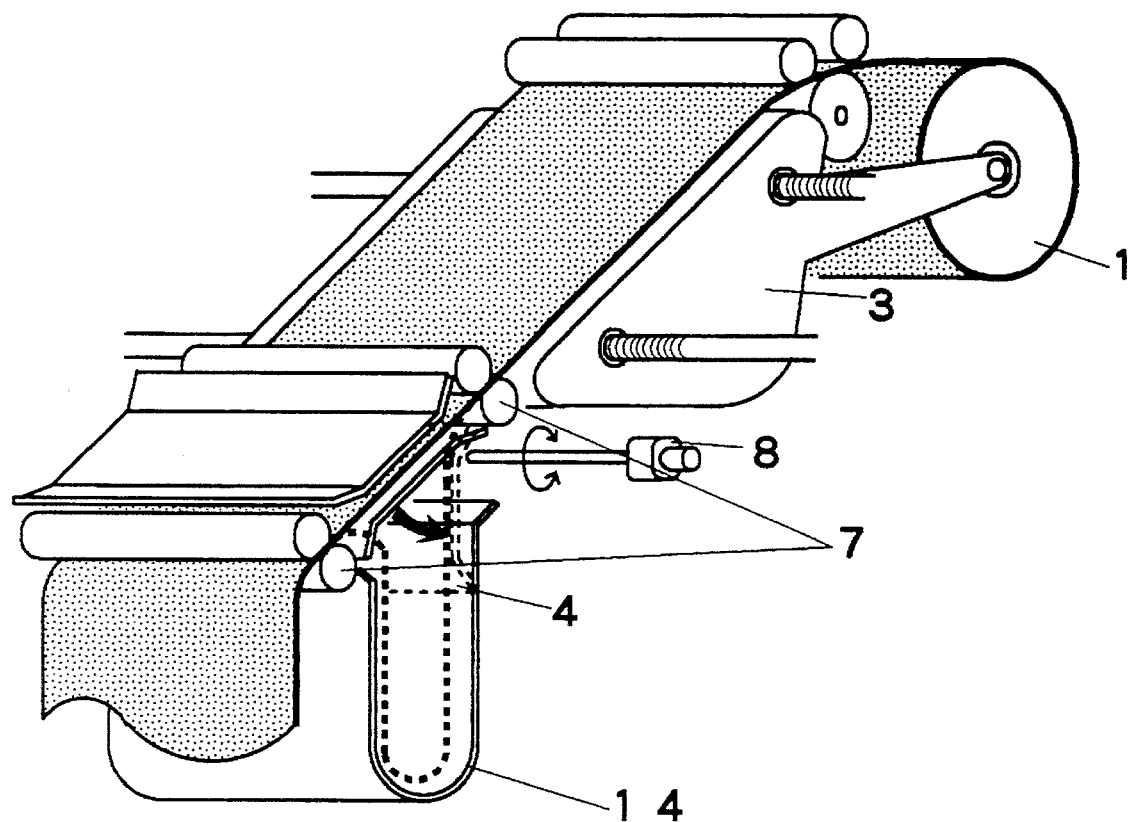

PRINTING/DEVELOPING APPARATUS

TECHNICAL FIELD

The present invention relates to a printing/developing apparatus for normal photographs or 3D stereoscopic photographs using a lenticular sheet. In particular, the present invention relates to a mechanism for transporting printing paper used in a printing/developing apparatus in which a exposure stage or an lens unit is movably disposed with respect to a negative mask.

BACKGROUND ART

As a common method of preparing 3D stereoscopic photographs using a lenticular sheet, an indirect method is generally employed. In this method, a deep focused object is photographed with a camera charged with a normal film while the camera is moved horizontally or arcuately by a predetermined distance to prepare a plurality of negatives which contain images photographed with different angles. In these negatives, the position of images is shifted with each other in accordance with the distance between the camera and the object. Instead of taking photographs while a camera is moved, it is also possible to use a camera which contains a plurality of lenses aligned horizontally or a plurality of horizontally disposed cameras, to effect a simultaneous photographing to obtain a plurality of negatives. Although the number of the negatives is not particularly limited, it is generally 3 to 5.

In the indirect method, a plurality of negatives obtained as above are exposed on a photosensitive sheet composed of a lenticular sheet and a sensitized material applied onto the flat face of the lenticular sheet. The exposure is conducted in such a manner that the negatives are exposed by the use of an ordinary projection lens but with different projection angles to form images on the photosensitive sheet. When an image of a negative is projected onto the photosensitive sheet, the image is divided parallel to the axis of the lenticular lenses in the photosensitive sheet and compressed into a line. The projected image forms discrete and compressed line images on the sensitized layer of the back face of the lenticular lens sheet. Thereafter, the next adjacent negative is exposed under the condition where the relative position between the projection lens and photosensitive sheet is changed so as to form a new line image juxtaposed with the previously formed line image. This process is repeated to fill the entire back face of the lenticular lenses widthwise with line images originated from different negatives. Thus, images of a plurality of negatives can be printed on a piece of photosensitive sheet. A plurality of exposures may be simultaneously conducted using a multiple projection lenses.

When the exposed photosensitive sheet is developed and looked at from the lenticular lenses' side, the line images formed in the sensitized layer are enlarged widthwise so that we can see a restored image. If a person looks at the developed lenticular sheet at a specific distance from his or her eyes, the right and the left eyes can receive different images adjacent to each other, and the two separate pieces of visual information are combined in his or her brain to achieve a stereoscopic viewing.

As described above, in order to obtain a single stereoscopic photograph, a plurality of exposures are required while changing the projection angle. FIG. 1 shows a perspective view of a conventional printing/developing apparatus for 3D stereoscopic photographs. A required projection angle is obtained by a movably disposed exposure stage and a movably disposed lens unit. To secure free movement of the exposure stage and the lens unit, a rolled printing paper conveyed by a set of rollers is first cut into pieces of sheet by a cutter and then fed to the exposure stage. Paper chips generated at the time of cutting of the roll paper may have a detrimental effect on exposure, and therefore, they are eliminated by vacuum or the like. Thus, the cutting section for a rolled printing paper comprises a cutter and a paper chips disposing unit.

In the processing of 3D stereoscopic photographs, sheets of printing paper are manually developed by the use of a printing/developing apparatus for this specific purpose of producing 3D photos equipped with a movable lens unit and a movable exposure stage. In the area of producing ordinary photographs, especially for producing very common, so-called service prints or providing services of simple enlargement, printing/developing apparatuses equipped with a fixed set of lenses, a fixed exposure stage, and means for developing and drying are frequently used, and a rolled printing paper is developed as is before cut into sheets at the final stage of the process. In the production of ordinary photographs, however, if trimming is specifically ordered, manual procedure of development is followed and a specialized printing/developing apparatus equipped with a movable lens unit and a movable exposure stage is used.

In the field of printing/developing apparatus for photographs, speed-up of processing is required as well as improved image qualities and long life of image qualities. As a result of efforts for improving the efficiency in the processing performance of printing/developing apparatus, and also as a result of using highly sensitive printing papers carrying a thin layer of emulsion, time required for the steps of exposure, development and drying has become shortened. On the other hand, a variety of consumers' needs including increased needs for the special size photographs such as panorama photos have resulted in the presence of various standards of photos. Thus, it remains a pressing need in the industry to provide a printing/developing apparatus which meets the requirements of various standards.

Having regard to the physical form of printing papers in the course of being transported in a printing/developing apparatus, there are two forms; one is a sheet and the other is a roll. Several problems are found, as discussed below, in a developing process in which a printing paper is fed as sheets, as compared with the case in which a printing paper is fed in a roll-form without being cut.

Cutting a rolled printing paper into sheets inevitably adds an extra interval before the exposure process, and this will result in a decrease in processing efficiency. Additionally, it will add the complexity to processing of paper chips and a need for extra maintenance of the apparatus, and the apparatus tends to become larger since both a cutter and a paper chip disposing unit must be mounted in front of the exposure stage composed of an intricate driving mechanism. The processing efficiency of sheets of paper in a developing process also becomes lower than that of a roll paper.

The transporting mechanism for sheets of paper has to be composed of many transporting rollers. Such rollers must be installed at intervals at least shorter than the length of a sheet of paper. These transporting mechanisms are illustrated in FIGS. 2 and 3. The transporting path of a printing paper is shown by bold arrows in each Figure. FIG. 2 is a cross-sectional view of a transporting mechanism for sheets of paper, while FIG. 3 is that for a roll paper.

As shown in FIG. 2, when the transporting path of sheets of printing paper is composed of complicated curves, it requires a particularly large number of transporting rollers 9, and that leads to the difficulty of securing room for a guide 13. The loading edge of sheets of printing paper is apt to be diverted from the transporting path and tends to cause a paper jam in the transporting path. By contrast, as illustrated in FIG. 3, the transportation of a rolled printing paper requires only a small number of rollers 11, and in addition, it rarely suffers a paper jam because the transporting path is directed by a guide 15.

In view of these problems, a rolled printing paper is assumed to be more advantageous in the aspects of processing efficiency and simplification of the apparatus. However, it is difficult to apply it to a printing/developing apparatus for stereoscopic photographs because the exposure stage and the lens must be movable to accommodate multiple exposures for a single picture while changing projection angles. In other words, the adoption of a rolled paper-transporting system in a printing/developing apparatus for stereoscopic photographs adds limitations to the movement of the exposure stage. In addition, it is also difficult to apply it to a printing/developing apparatus for ordinary photographs in which trimming will be performed, because the exposure stage, etc. must be movable. The present invention, therefore, intends to encompass a printing/developing apparatus capable of transporting a rolled printing paper, aiming at improvements in the processing efficiency and simplification of the apparatus.

DISCLOSURE OF THE INVENTION

For the purpose of solving the aforementioned problems, the present invention proposes that, in a printing/developing apparatus using a rolled printing paper, the apparatus be equipped with loop spaces in the transporting path of a printing paper at positions in the front and rear of the exposure stage.

The movement of the exposure stage is secured by these loops. When a roll paper is supplied from a fixed structure, the loop spaces are provided at positions in the front and rear of the exposure stage for enabling the exposure stage to move. When the magazine for a roll paper is small in size, the magazine may be integrated with the exposure stage so that the roll paper can adequately be fed in accordance with the movement of the exposure stage, by a provision of a single loop space at a position in the rear of the exposure stage.

The loop(s) formed in the transporting path may be retained or removed whenever the movement of the exposure stage is not necessary, because the processing time required for printing and finishing development becomes longer as the transporting path is lengthened corresponding to the length of the loop(s). Taking as an example of a printing/developing apparatus used for both normal and stereoscopic photographs, the loops may not be formed to shorten the transporting path when processing normal photographs because the exposure stage is not required to be moved. Alteration of the transporting path may be carried out by the guide or the transporting rollers, etc.

FIG. 4 shows a perspective view of another embodiment of the printing/developing apparatus according to the present invention. When the negative mask unit and the lens unit are movable as illustrated in FIG. 4, the exposure stage section can be fixed, thus enabling the use of a rolled printing paper.

According to the printing/developing apparatus of the present invention, the processing capacity is enhanced because a rolled printing paper can be used even when the negative mask unit and the exposure stage section are movable. The roll paper feeding also helps increase the freedom in the design of the apparatus, creating no restrictions on the position of the cutter to be installed. Thus, the cutter and paper chips disposing unit can be installed at any place convenient for processing paper chips and for achieving easy maintenance. Furthermore, the adoption of roll paper feeding ensures many advantages such as simplification of the transporting mechanism and alleviation of paper jams because the number of transporting rollers can be reduced and the guides can be installed continuously along the transporting path.

BRIEF DESCRIPTION OF THE DRAWINGS

FIG. 5 is a perspective view of the exposure stage and its adjacent area of an embodiment of the printing/developing apparatus of the present invention, and FIG. 6 is a perspective view of the exposure stage and its adjacent area of an embodiment of the printing/developing apparatus of the present invention.

BEST MODE FOR CARRYING OUT THE INVENTION

Figure 1:
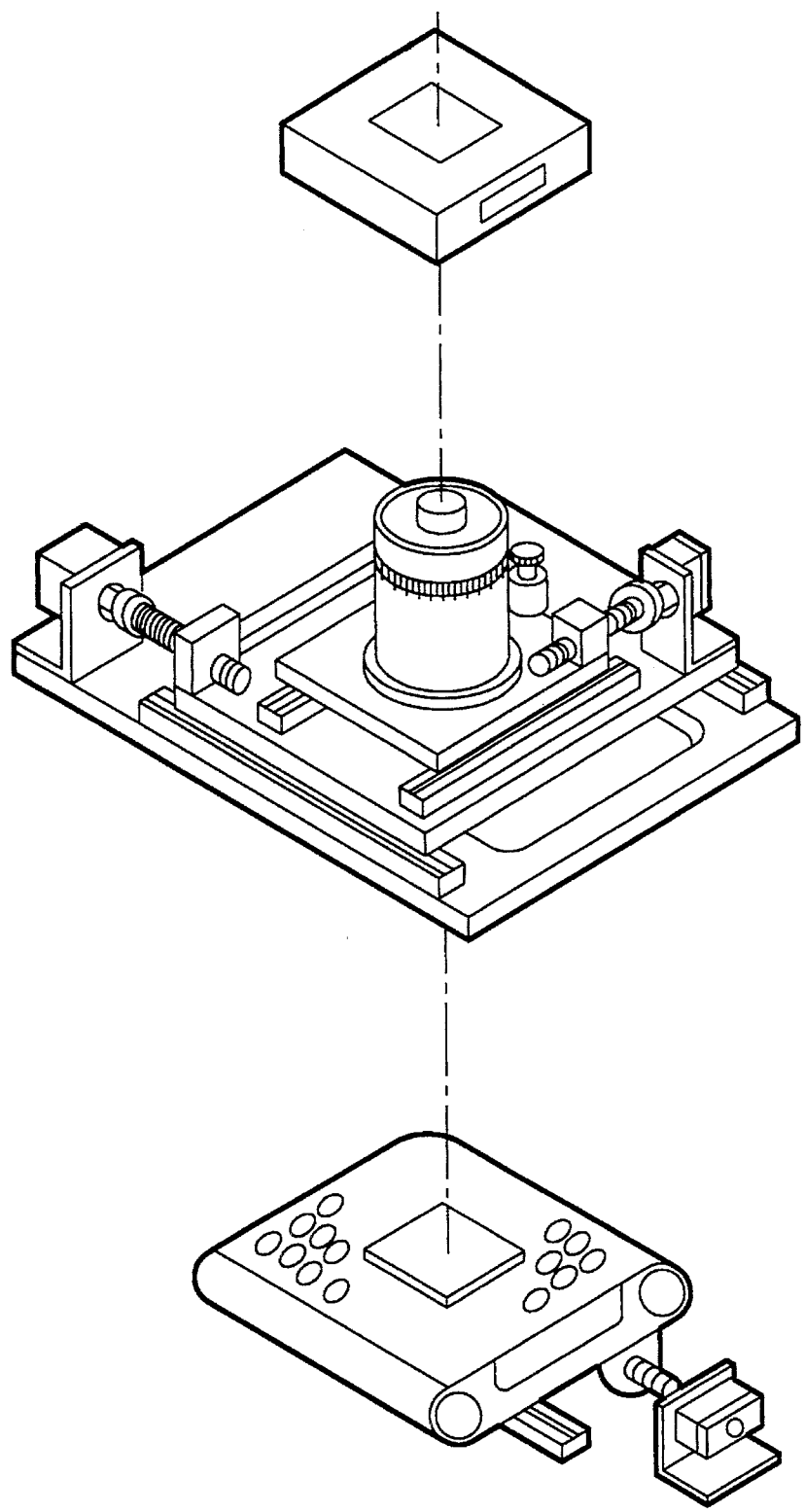
FIG. 1 is a perspective view of a conventional printing/developing apparatus for 3D stereoscopic photographs.
Figure 2:
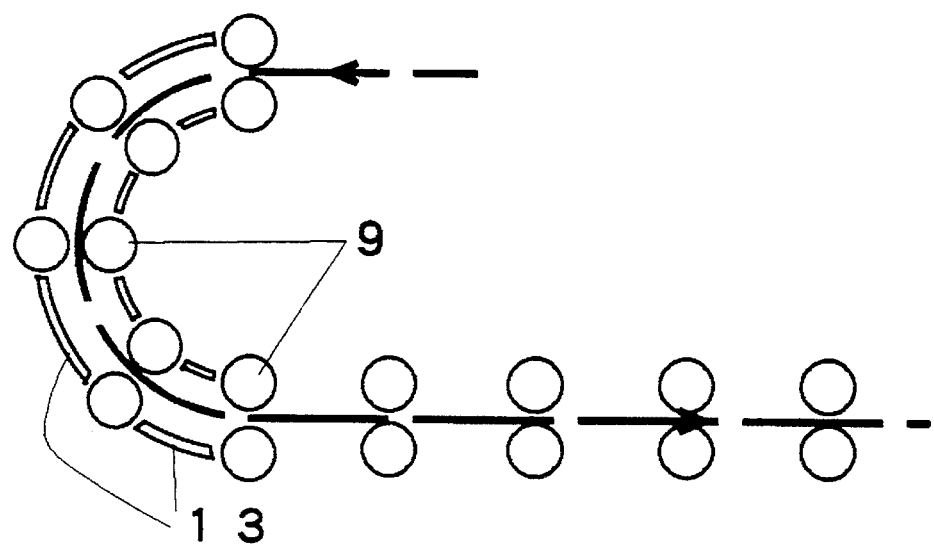
FIG. 2 is a cross-sectional view showing a transporting mechanism for sheets of prying paper of a printing/developing apparatus.
Figure 3:
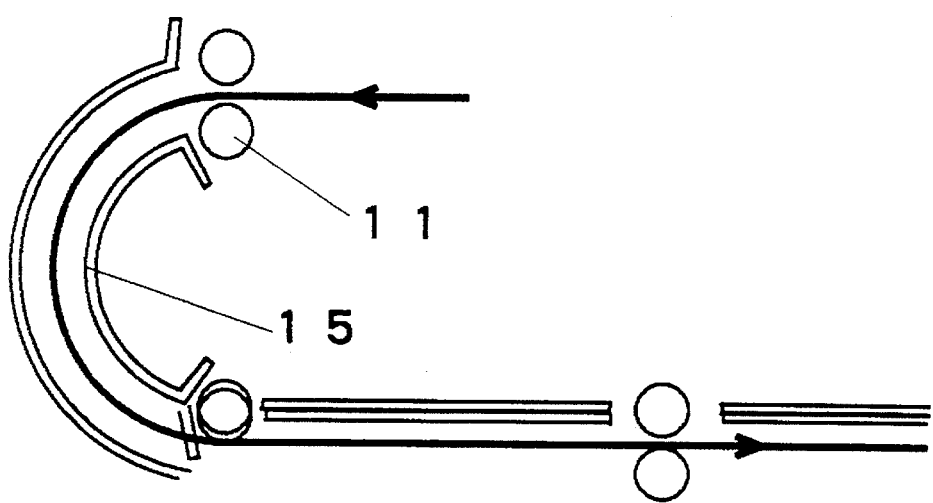
FIG. 3 is a cross-sectional view showing a transporting mechanism for sheets of printing paper of a printing/developing apparatus.
Figure 4:
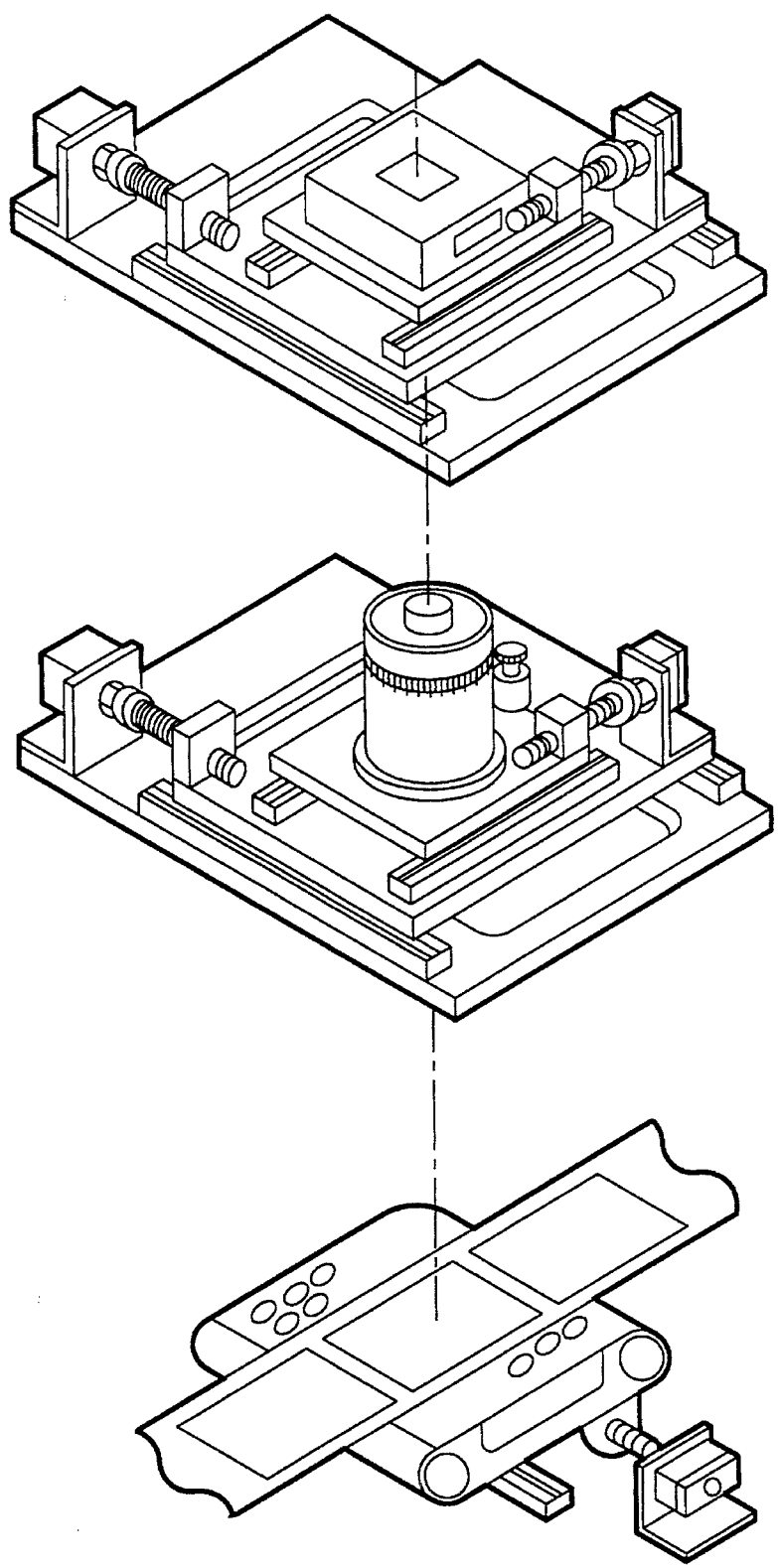
FIG. 4 is a perspective view of another embodiment of the printing/developing apparatus of the present invention.

Embodiments of the printing/developing apparatus of the present invention will be described with reference to the accompanying drawings. FIG. 5 is a perspective view of an exposure stage and its adjacent section of the printing/developing apparatus for stereoscopic photographs of the present invention, showing the two loop spaces at positions in the front and rear of the exposure stage which enable the exposure stage to move. The printing paper is supplied from a fixed roll paper 1. When the exposure stage 3 is not required to be moved, the loop guides 2 and 4 support the printing paper in the direction of transporting, forming no loop spaces.

When the exposure stage 3 is to be moved, the loop guides 2 and 4 are dropped down by rotating loop motors 6 and 8. The printing paper is directed to loop boxes 12 and 14 by its own weight. The loops are formed by rotating transporting rollers 5 and 7 positioned in the front and rear of the exposure stage, and the size of the loops are kept constant by controlling the rotation of the transporting rollers.

FIG. 6 is a perspective view of the exposure stage and its adjacent area of another embodiment of the present invention. In this apparatus, a loop space is provided in the rear of the exposure stage, and the exposure stage and the magazine for roll paper are arranged to move together. In the same manner as shown in the embodiment of FIG. 5, the loop guide 4 helps to support the printing paper in the direction of transporting when the exposure stage does not need to be moved, while the printing paper is directed to a loop box 14 by dropping down the loop guide 4 by rotating the loop motor 8 when the exposure stage 3 is to be moved. The size of the loop is kept constant by controlling the rotation of the transporting roller 7 installed in the rear of the exposure stage.

We claim:

1. A printing/developing apparatus for 3D stereoscopic photographs comprising a movable arrangement of either an exposure stage or a lens unit and an exposure stage, the exposure stage being for 3D stereoscopic photographs and being arranged such that the stage moves rolled photographic printing paper while holding the printing paper thereon in a direction parallel to a surface of the printing paper in a minute movement, during which movement the printing paper is exposed a plurality of times, wherein said apparatus is equipped with loop spaces in a transporting path of a photographic printing paper at positions in the front and rear of the exposure stage for enabling the apparatus to process the rolled photographic printing paper.

* * * * *